United States Patent [19]
Baker

[11] Patent Number: 4,602,854
[45] Date of Patent: Jul. 29, 1986

[54] POLYHEDRAL RING MIRRORS AND THEIR MANUFACTURE

[75] Inventor: Ronald L. Baker, Jefferson County, Colo.

[73] Assignee: AT&T Technologies, Inc., Berkeley Heights, N.J.

[21] Appl. No.: 704,698

[22] Filed: Feb. 25, 1985

[51] Int. Cl.$^4$ .......................... G02B 5/08; B26D 5/20; B26D 5/22; B29D 11/00

[52] U.S. Cl. .................................. 350/616; 350/320; 83/872; 356/388

[58] Field of Search ........................ 350/169, 170–174, 350/600–602, 611–614, 626, 631–633, 639, 320; 83/872; 51/283; 408/103–106; 30/93, 101, 102, 115; 33/283, 174 C; 356/388

[56] References Cited

U.S. PATENT DOCUMENTS

| | | | |
|---|---|---|---|
| 3,117,178 | 1/1964 | Webber | 350/616 |
| 3,471,236 | 10/1969 | Pearson . | |
| 3,989,495 | 11/1976 | Siegmund | 350/320 X |
| 4,101,365 | 7/1978 | Fisli | 350/616 X |
| 4,127,969 | 12/1978 | Hoshi | 51/283 R |
| 4,277,141 | 7/1981 | Klieber | 350/616 |
| 4,420,909 | 12/1973 | Steeve | 51/283 X |

OTHER PUBLICATIONS

"Pyramids and Pyramiding", Portfolio, 8/31/75, D. Mcllellan.

Primary Examiner—Donald Watkins
Attorney, Agent, or Firm—R. F. Kip, Jr.

[57] ABSTRACT

A polyhedral ring mirror is manufactured by molding a synthetic resinous blank having in it a cavity in the form of a four-sided pyramid. The wall surfaces of the cavity are metallized to make them light reflective. The blank is then sliced through in a plane normal to the cavity axis to sever from the blank a minor portion, and to leave behind a major portion in which the form of the cavity has been converted into a truncated pyramid having opposite its original opening a smaller opening. The modified blank with the doubly open cavity is placed, smaller opening down, on a printed wire wiring board around a rectangular electrical component on the board to permit visual inspection from a single viewing point above the component, of all of its sides. The size of the large opening of the cavity can be adjusted by slicing away another portion of the blank.

14 Claims, 8 Drawing Figures

POLYHEDRAL RING MIRRORS AND THEIR MANUFACTURE

FIELD OF ART

This invention relates, generally to mirrors and the manufacture thereof. More particularly, this invention relates to the structure and manufacture of polyhedral ring mirrors which are useful in the inspection of electrical components, and which have other applications as well.

BACKGROUND OF THE INVENTION

U.S. patent application Ser. No. 534,031 filed Sept. 20 1983 now U.S. Pat. No. 4,585,351, F. J. Gronek et al for "Apparatus for Inspecting Surface Mounted Components", and assigned to the assignee hereof, and incorporated herein by this reference, discloses in FIGS. 7 and 8 a polyhedral mirror for side inspection of electrical components surface mounted on printed wiring boards. Such polyhedral mirror comprises four square separate metal mirror members mounted on four sides of a through cavity in a bracket member so that the mirrors each have an inward slant in the downward direction. A polyhedral mirror of such sort is useful in, say, inspecting all four sides of chip carriers or other rectangular electrical components mounted on printed wiring boards. In use, the device is positioned to surround the component so that the four mirrors of the device register with and are outward of the four sides of the component. Light from these sides is reflected by the mirrors upward into a low power microscope to permit inspection of the component sides from above.

Such polyhedral mirror arrangement has, however, the disadvantages that its structure is costly and that different size mirrors must be made from different size parts.

SUMMARY OF THE INVENTION

These and other disadvantages are overcome according to the invention by the plastic molding of a synthetic resinous member having therein a cavity with an original opening at the front of the member. The cavity is interiorly bounded by a circumferential ring of planar cavity wall surfaces each inclined at an acute angle to the ring axis, and all oriented with respect to each other so that the cavity is of constant polyhedral shape in cross-sections thereof in planes which are normal to such axis to be parallel to a reference plane, and so that the cross-sectional size of such ring tapers convergently in one axial direction thereof.

As a next step, the ring wall surfaces are metallized to form on an area of each a light-reflective layer of metallic material. The plastic member is then modified by removing therefrom a portion thereof divided off from the remainder of the member by a separation plane parallel to the mentioned reference plane and intersecting all of the mentioned planar wall surfaces. Such removing step provides for the ring at one end a polygonal opening of a size which is different in size from the original opening of the cavity, and which size can be varied by adjusting the spacing between the separation plane and the reference plane and, thus, can be preselected. The member as so modified has use as a polyhedral ring mirror in the manner described above.

While the above-described technique can be used to manufacture from molded members with initially duplicate cavities a plurality of duplicate polyhedral ring mirrors, the technique is particularly useful in that, by merely adjusting the spacing between the reference and separation planes, it can be used to manufacture from members with initially duplicate cavities a plurality of finished devices providing polyhedral ring mirrors which are of different size for inspection of differently sized electrical components or other objects.

Further change in the size and/or shape of the mirrors can be realized by further modifying the already modified member by removing therefrom another portion thereof divided off from the remainder of the member by another separation plane parallel to the reference plane and intersecting all of the mentioned ring of cavity wall surfaces within the member. In this manner, both openings of the mirror can be of a respective preselected size different from that of the original opening of the cavity.

BRIEF DESCRIPTION OF THE DRAWINGS

For a better understanding of the invention, reference is made to the following description of an exemplary embodiment thereof and to the accompanying drawings wherein.

DETAILED DESCRIPTION OF EMBODIMENT

Figure 1:
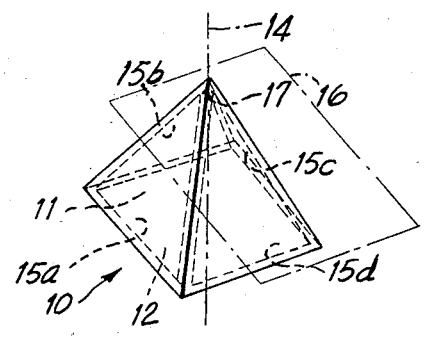
FIG. 1 is an isometric view of a typical molded member or blank produced to provide according to the invention a polyhedral ring mirror.
Figure 2:
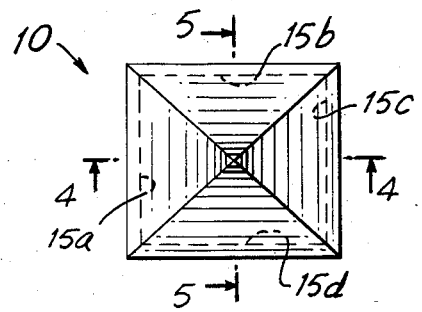
FIG. 2 is a top view of the FIG. 1 blank.
Figure 3:
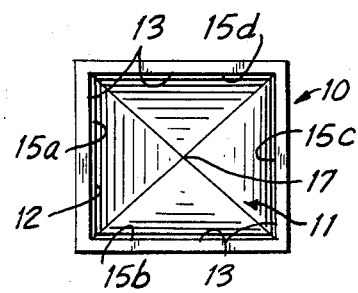
FIG. 3 is a bottom view of the FIG. 1 blank.

Referring now to FIGS. 1-3, the reference numeral 10 designates a standard molded member or blank constituted of synthetic resonant material as, say, high density polystyrene and produced by any suitable conventional plastic molding operation as, for example, thermoplastic injection molding. Blank 10 has therein a cavity 11 having an original opening 12 at the front of the blank. Cavity 11 is interiorly bounded by a circumferential ring 13 of planar cavity wall surfaces 15a–15d. Wall surfaces 15a–15d are each inclined at an acute angle to the axis 14 of the ring, and those surfaces are oriented with respect to each other so that ring 13 has a cross-section of constant polygonal shape in planes normal to axis 14 to be parallel to a reference plane (which may be, say, a plane 16 passing through the middle of cavity 11), and so that the cross-sectional size of the ring tapers convergently in the direction along axis 14 towards the inner end of cavity 11. In the case of blank 10, cavity 11 is in the form of a regular four sided pyramid of which the sides 15a–15d are congruent isoceles triangles meeting at the inner end of the cavity in an apex 17. Cavity 11 may, however, have other configurations. Moreover, the outside of blank 11 may have various shapes. In order, however to economize on plastic material, it is convenient for the exterior of blank 10 to be, as shown in FIG. 2 of the same shape as cavity 11 so that the thickness of the material between the inside and outside of the blank is substantially uniform all over the blank. Typically, such wall thickness may be 0.125 inch, and the length of any exterior edge of the blank between two of its triangular sides may be 3 inches. Such edge dimension can, of course, be varied as is convenient.

Figure 4:
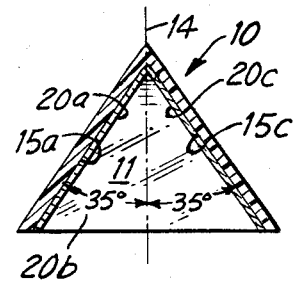
FIG. 4 is a cross-section in front elevation, taken as indicated by the arrows 4—4 in FIG. 2, of the mentioned blank after treatment thereof to produce light reflective surfaces on the interior wall surfaces of the cavity in the blank.
Figure 5:
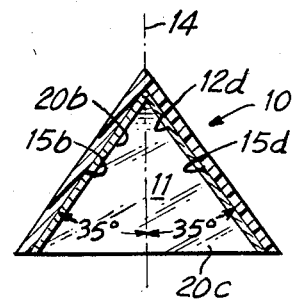
FIG. 5 is a left side elevation, taken as indicated by the arrows 5—5 in FIG. 2, of the FIG. 4 metallized blank.

Following the molding of the blank 10 shown in FIGS. 1–3, its interior wall surfaces 15a–15d are metallized to acquire thereon the respective mirror layers 20a–20d of light reflective metallic material which are shown in FIGS. 4 and 5. Such mirror layers may be provided by any appropriate conventional metallizing processing as, for example, by placing blank 20 in a vacuum chamber and depositing the layers 20a–20d on the wall surfaces 15a by the well known sputtering technique. Layers 20a–20d may conveniently be constituted of titanium, although other metallic materials may be used. The deposition of the layers 20a–20d on wall surfaces 15a–15d may incidentally result in the exterior as well as the interior of blank 10 being covered by a metallic deposit but, since any such deposit on the exterior of blank 10 would not be useful for the specific purpose contemplated herein of inspecting rectangular electrical components, such exterior deposit is not shown in FIGS. 4 and 5. Mirror layers 20a–20d cover areas of wall surfaces 15a–15d which are the whole of such surfaces but, if desired those layers may cover lesser areas of such surfaces.

Figure 6:
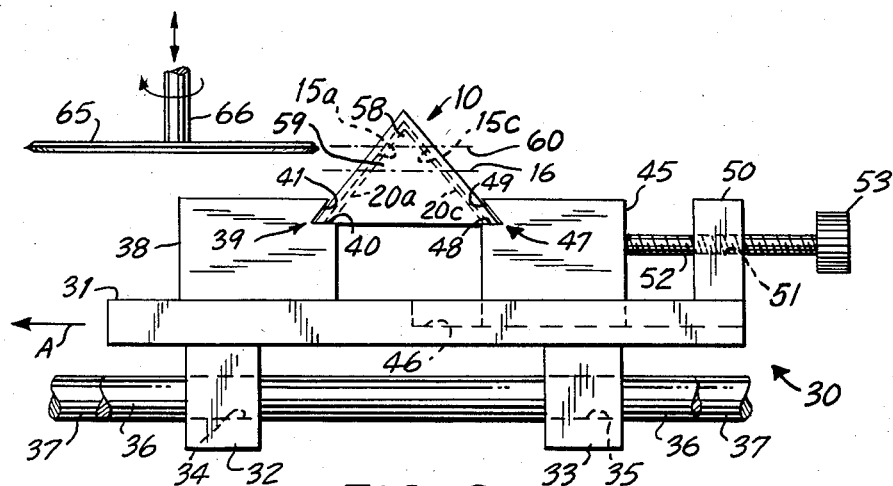
FIG. 6 a view in front elevation of the blank of FIGS. 4 and 5 being held in a workholder for purposes of removing a portion of the blank.

Turning now to FIG. 6, after the interior of blank 10 has been metallized as described above, it is placed in a workholder 30 comprising a horizontal carriage 31 from which are downstanding a pair of longitudinally spaced legs 32, 33 each having formed therein front and back longitudinal side bores of which are shown only the front bores 34, 35 for, respectively, the legs 32, and 33. Received within these side bores are front and back horizontal guide bars 36 and 37 on which carriage 31 is slidable to be longitudinally movable back and forth in a fixed path.

Mounted on top of carriage 31 at its left hand end is a fixed vise block 38 having formed in its upper right corner a "V" notch 39 extending laterally from side to side of block 37, and of which the lower face 40 of notch 39 is horizontal while its upper face 41 is inclined to face 40 at the same acute angle as exists between the base and the sides of the exterior pyramidal shape of blank 10.

Carriage 31 also supports in its top at its right hand end a vise block 45 slidably received in a way 46 formed in carriage 31 so to be constrained by that way to be movable only longitudinally back and forth in a fixed path. Movable vise block 45 has formed therein at its upper left hand corner a "V" notch 47 at the same vertical level as notch 39 in block 38 and extending laterally from side to side of block 45. Notch 47 has a lower horizontal force 48 and an upper face 49 inclined to face 48 at the same acute angle as that made between the faces 40, and 41 of notch 39.

Fixedly mounted on carriage 31 to the right of vise block 45 is an upwardly projecting stand 50 having formed therein a longitudinal threaded bore 51 in which is received a lead screw 52 with a large head 53 at its right hand end, screw 52 bearing at its left hand end against the right side of vise block 45. By clockwise turning of screw 52, block 45 may be advanced leftward to approach closer to fixed block 38. For retraction of the movable block 45 away from block 38, screw 52 is turned counterclockwise a desired amount to draw it away from block 45, and block 45 is then manually shifted rightward until it again bears against the front end of the lead screw.

FIG. 6 depicts a condition in which the metallized blank 10 has been placed between the vise blocks 38 and 45 and the latter block has been advanced toward the former (by turning of screw 52) until opposite edges of the base of the blank are received in the "V" notches 39 and 47 and blank 10 is firmly gripped between the two vise blocks. In this condition, most of the blank 10 projects above the tops of block 37 and 45 to be accessible from the side to a work-performing tool.

With metallized blank 10 being gripped by a workholder in the exemplary manner shown by FIG. 6, there is now conducted on such blank the step of modifying it by removing from it a portion 58 thereof which is divided off from the remainder 59 of the blank by a separation plane 60 parallel to reference plane 16 and intersecting all of the wall surfaces 15a–15d (FIG. 13) of the ring 13 of cavity 11 in the blank. The spacing of separation plane 60 from reference plane 16 is chosen so that the removing step will cause the opening of ring 13 at its upper end to be of a preselected size. Such size can be varied by selectably varying the spacing between planes 16 and 60, and such size is different from that of the original opening 12 (FIG. 3) of cavity 11. While the step of removing the material of portion 58 from the remainder 59 of the blank can be performed by various machining operations including grinding, conveniently it is performed by slicing the portion 58 away from the blank remainder 59 by making a cut in the blank along separation plane 60 by a cutting tool. In FIG. 6, such tool takes the exemplary form of a diamond saw 65 concentrically mounted on the lower end of a vertical shaft 66 which is rotatable and adjustable in vertical position. Saw 65 is in the form of a thin circular disc blade with abrasive diamond distributed around its periphery to provide a cutting edge therefor.

The FIG. 6 apparatus is used as follows to perform the slicing step. With metallized blank 10 being gripped as described between vise blocks 38 and 45 and being well rightward of saw 65, shaft 66 is adjusted in vertical position to cause the saw to lie in the selected separation plane 60. Shaft 66 is then set into rotation to drive saw 65. While saw 65 is rotating, carriage 31 is manually advanced leftward (as indicated by arrow A) to cause blank 10 to first bear against the saw and then be sliced thereby so as to sever portion 58 from the remainder 59 of the blank. Thereafter, carriage 31 is manually moved rightward to remove the modified blank from beneath saw 65, and the modified blank is released from its grip by the vise blocks 38, 45 so as to be ready for use.

Figure 7:
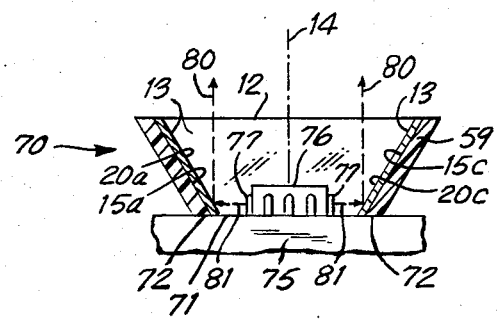
FIG. 7 is a front elevation in cross-section of the blank of FIGS. 4 and 5 when modified by the removal operation depicted in FIG. 6, and when used for purposes of inspecting an electrical component.

FIG. 7 shows a use of the polyhedral mirror 70 which provided by blank 10 when modified as described above in connection with FIG. 6. Mirror 70 is the same object as the blank portion 59 of FIG. 6 but is upside down in relation to that blank portion and, moreover, is given a different reference numeral because it is the finished product. As shown in FIG. 7 the ring 13 of truncated wall surfaces 15 and mirror layers 20 has a lower opening 71 surrounded by a planar surface 72 formed in the bottom of the mirror by the removal step described in connection with FIG. 6. Surface 72 provides for mirror 70 a base surface for resting it on a support shown in FIG. 7 as being a portion of a printed wiring board 75 having surface mounted thereon a rectangular (i.e., square or oblong) electrical component 76. On each of the four sides of component 76 are leads 77 connected by solder connections to printed or other conductors (not shown) on board 75. For purposes of inspecting those solder connections, mirror 70 is placed, as shown, on board 75 so that each of its four mirror layers 20 is opposite a respective one of the four sides of component 76 to reflect light therefrom upwardly and parallel to the axis 14 of the mirror. Thus, the mentioned solder connections on all four of such sides can readily be inspected from above and from essentially a single viewing point. If it is desired to look inward at the sides of component 76 in the horizontal direction, this can be done by providing between axis 14 and the wall surfaces 15 and mirror layers 20 of mirror 70 an acute angle of 45 degrees. It has been found more convenient, however to look, from the viewing point, at the component sides not only inward but slightly downward, and that slightly downward viewing is realized by making such acute angle moderately less than 45 degrees as, for example, the 35 degree angle shown in FIGS. 4 and 5. That such 35 degree angle will provide such downward viewing is illustrated in FIG. 7 by the light rays 80 and 81 with respect to which it is evident that, if such acute angle is less than 45 degrees and the light rays 80 reflected from the mirrors are to be vertical and parallel to axis 14, then the light rays 81 emanating from the sides of component 76 and incident on mirrors layer 20 to produce reflected rays 80 must, of necessity, be inclined upwards as they depart from their origin in order for rays 80 to be vertical.

Figure 8:
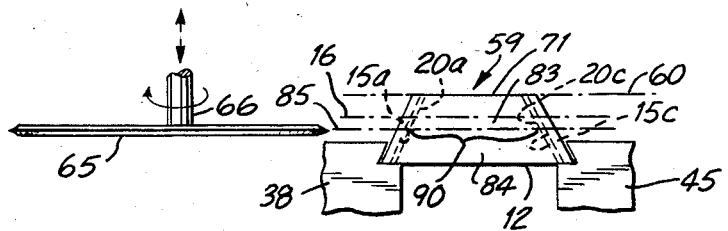
FIG. 8 is a fragmentary view in front elevation of the workholder depicted in FIG. 6 when it is used to perform on the blanks of FIGS. 4 and 5 a removal operation in addition to that illustrated in FIG. 6.

It may happen that, when mirror 70 is made from a blank 10 of standard size and shape and the lower opening 71 of the mirror is proportioned by the slicing operation of FIG. 6 to be best suited to the size of a particular kind of electrical component to be inspected, then the upper opening 12 of the mirror will be inappropriately great so that the top of the mirror stands higher than desired above the printed wiring board 75. This shortcoming can, however, be readily cured by performing on the modified blank 59 an additional operation which further modifies the original blank be removing therefrom a portion 83 thereof divided off from the remainder 84 of blank 59 by a separation plane 85 parallel to reference plane 16 and intersecting all the interior wall surfaces 15 of the blank. As before, such additional removing step can be effected by various machining operations included grinding. Conveniently, however, it can be done by the method step shown in FIG. 8 wherein, after modified blank 59 has been moved rightward away from saw 65 (as earlier described in connection with FIG. 6), the blank is not removed from vise blocks 38 and 45 but, rather, continues to be gripped by such blocks. With modified blank 59 being held in such condition, the rotation of shaft 66 is stopped, the shaft is next vertically adjusted to a position which holds saw 65 in separation plane 85, shaft 66 is then again set into rotation to drive saw 54 and, thereafter, and as in the FIG. 6 step, the modified blank 55 is moved leftward until saw 65 cuts in plane 85 through the blank to sever the portion 83 from the 84. Portions 84 remains gripped by vise blocks 38, 45 and becomes the polyhedral ring mirror used for inspection purposes. Such mirror will, in use, have the desired size smaller opening 71 and, in addition, will have a larger opening 90 of a size which is preselected and which can be varied by appropriate selection of the spacing between separation plane 85 and reference plane 16.

Polyhedral ring mirrors according to the invention thus provide the advantages of being manufacturable from inexpensive materials and in an inexpensive manner. Moreover, the method described herein of manufacture of such mirrors is capable of providing further cost reduction by permitting polyhedral ring mirrors differing from each other in the size of the smaller openings thereof, or in the sizes of both the smaller and larger openings thereof, to all be manufactured from blanks of one standard size and shape.

The above described embodiment and mode of manufacture thereof being exemplary only, it is to be understood that additions thereto, omissions therefrom and modifications thereof can be made without departing from the spirit of the invention. For example, the cavity in the blank may be a through cavity having openings at each of its opposite ends. Further, the cavity need not be wholly pyramidal in shape so long as it is interiorly bounded by a circumferential ring of planar cavity wall surfaces at an acute angle to the ring axis and oriented with respect to each other to give the ring a cross section of constant shape and of a size which progressively decreases in one axial direction of the ring. As another example, the blank which is molded may include two or more cavities, the operations described above may be performed concurrently with respect to all such cavities, and after those operations have been performed, the blank may be separated into pieces each constituting a polyhedral ring mirror of the character described above.

Accordingly, the invention is not to be considered as limited save as is consonant with the recitals of the following claims.

What is claimed is:

1. A method of manufacture of a polyhedral ring mirror comprising, molding synthetic resinous material into a blank having therein a cavity having an initial opening and interiorly bounded by a circumferential ring of planar cavity wall surfaces each inclined at an acute angle to the ring axis, and all oriented with respect to each other so that said ring has a cross-section of constant polygonal shape in planes normal to said axis and parallel to a reference plane, and so that the cross-sectional size of said ring tapers convergently in one axial direction thereof, metallizing said wall surfaces to form on an area of each thereof a mirror layer of light reflective metallic material, and then modifying said blank by removing therefrom a portion thereof divided off from the remainder of said blank by a separation plane parallel to said reference plane and intersecting all said wall surfaces so as to provide for said ring at one end thereof a polygonal opening of a preselected size different from that of said initial opening of said cavity, and said modified blank providing a polyhedral ring mirror.

2. The method according to claim 1 in which said wall surfaces taper converguently towards said preselected size opening, and in which such removing step produces on said modified blank a planar surface surrounding such opening and providing for said modified blank a base surface for resting said mirror on a planar support therefor.

3. The method according to claim 1 in which said wall surfaces of said ring are all inclined at the same angle to the ring axis.

4. The method according to claim 1 in which each of said wall surfaces is inclined to the ring axis at an acute angle which is less than forty-five degrees.

5. The method according to claim 1 in which said wall surfaces lie in the side planes of a geometric pyramid having an apex coincident with the axis of said ring, and having a base in the form of a regular polygon normal to and centered on said axis.

6. The method according to claim 1 in which the external shape of said blank substentialy conforms, prior to said removing step, to the shape of the cavity therein so that the interior of said cavity is separated from the exterior of said blank by a thickness of synthetic resinous material of substantially uniform thickness.

7. The method according to claim 1 in which said removing step is performed by slicing said blank with a cutting tool which makes a cut in said separation plane so as to sever said portion from the remainder of said blank.

8. The method according to claim 1 in which said ring is rectangular in cross section in said planes normal to the ring axis.

9. The method according to claim 8 in which said ring is square in cross-section in such planes.

10. The method according to claim 1 further comprising modifying the already modified blank by removing therefrom an additional portion thereof divided off from the remainder of said blank by an additional separation plane parallel to said reference plane, so as to provide for said ring at the other end thereof a polygonal opening of a preselected size different than both that of said first-named ring opening and that of the said initial opening of said cavity.

11. The method according to claim 10 in which both of said removing steps are performed by slicing said blank with a cutting tool so as to make in each of said separation planes a cut which severs from the blank a portion thereof.

12. A method of manufacture of a polyhedral ring mirror comprising, molding synthetic resinous material into a blank having therein a cavity having an initial opening and interiorly bounded by a circumferential ring of planar cavity wall surfaces each inclined at substentially the same acute angle to the ring axis, and all oriented with respect to each other so that said ring has a rectangular cross-section of constant shape in planes normal to said axis and parallel to a reference plane, and so that the cross-sectional size of said ring tapers convergently in one axial direction of said cavity, metallizing said wall surfaces to form on an area of each thereof a mirror layer of light-reflective metallic material, and slicing said blank by a cutting tool making a cut therethrough in a separation plane parallel to said reference plane and intersecting all said surfaces so as to sever a portion of said blank from the remainder thereof, and so as to provide for said ring, at one end thereof a rectangular opening of a preselected size which is different from that of said initial opening of said cavity, and said blank as modified by the severing therefrom of said portion providing a polyhedral ring mirror.

13. A common method of manufacture of a plurality of different polyhedral ring mirrors comprising; molding synthetic resinous material into a plurality of blanks which are duplicates of each other, and each of which has therein a cavity interiorly bounded by a circumferential ring of planar cavity wall surfaces each inclined at an acute angle to the ring axis, and all oriented with respect to each other so that ring has a cross-section of constant polygonal shape in planes normal to said axis and parallel to a reference plane, and so that the cross-sectional size of said ring tapers convergently in one axial direction thereof, metallizing areas of said wall surfaces of the ring in each of said plurality of blanks to form on each of such surfaces a mirror layer of light reflective metallic material, and then modifying each of said plurality of blanks by removing therefrom a portion thereof divided off from the remainder of said blank by a separation plane parallel to said reference plane and intersecting all said wall surfaces of the ring in such blank so as to provide for said ring at one end thereof a polygonal opening of a preselected size different from the initial opening of said cavity in such blank, each of said plurality of blanks as so modified providing a polyhedral ring mirror, and the spacing of the separation planes for the various ones of said plurality of blanks as so modified from the reference planes therefor being different for different of such blanks so as to provide polyhedral ring mirrors having different size ring openings therefor.

14. A polyhedral ring mirror comprising, a molded member constituted of synthetic resinous material and having therein a cavity with a first opening at the front of said member and interiorly bounded by a circumferential ring of planar cavity wall surfaces each inclined at an acute angle to the ring axis and all oriented with respect to each other so that said ring has a cross-section of constant polygonal shape in planes normal to said axis, and so that the cross-sectional size of said ring tapers convergently in one axial direction thereof, said cavity passing axially through said member so as to have a second opening at the rear of said member, and said second opening being surrounded by a planar rear surface of said member normal to the axis of said ring and providing for said member a base surface for resting said member on a planar support, and a layer of light-reflective metallic material formed on an area of each of said wall surfaces so as to adapt said member for use as a polyhedral mirror.

* * * * *